United States Patent
Diener

(10) Patent No.: US 12,162,081 B2
(45) Date of Patent: Dec. 10, 2024

(54) EXPANDABLE VACUUM CHAMBER AND METHOD FOR PRODUCING AN EXPANDABLE VACUUM CHAMBER

(71) Applicant: Christof-Herbert Diener, Nagold (DE)

(72) Inventor: Christof-Herbert Diener, Nagold (DE)

( * ) Notice: Subject to any disclaimer, the term of this patent is extended or adjusted under 35 U.S.C. 154(b) by 0 days.

(21) Appl. No.: 17/643,178

(22) PCT Filed: Jun. 10, 2020

(86) PCT No.: PCT/EP2020/066115
§ 371 (c)(1),
(2) Date: Dec. 7, 2021

(87) PCT Pub. No.: WO2020/249626
PCT Pub. Date: Dec. 17, 2020

(65) Prior Publication Data
US 2022/0266355 A1    Aug. 25, 2022

(30) Foreign Application Priority Data
Jun. 11, 2019    (DE) ............... 10 2019 208 435.4

(51) Int. Cl.
*B01L 1/02*    (2006.01)
*B23C 3/00*    (2006.01)
*B23C 9/00*    (2006.01)

(52) U.S. Cl.
CPC ............ *B23C 3/00* (2013.01); *B23C 9/00* (2013.01); *B01L 1/02* (2013.01); *B01L 2200/025* (2013.01);
(Continued)

(58) Field of Classification Search
CPC .......... B01L 1/02; B01L 1/025; B01L 3/5635; B01L 3/565; B01L 2200/025; B01L 2200/0689; B01L 2300/043; B01J 3/006
See application file for complete search history.

(56) References Cited

U.S. PATENT DOCUMENTS 4,454,407 A    1/1984   Binard
4,626,265 A *  12/1986  Adiletta ............... B01D 46/12
                                            96/135
(Continued)

FOREIGN PATENT DOCUMENTS

AU    2009208119 A1    3/2010
CN    1374058 A        10/2002
(Continued)

OTHER PUBLICATIONS

German Office Action issued in German No. 10 2019 208 435.4, Jun. 12, 2021.
(Continued)

*Primary Examiner* — Jill A Warden
*Assistant Examiner* — Dwayne K Handy
(74) *Attorney, Agent, or Firm* — Orbit IP, LLP; Marc G. Martino

(57) ABSTRACT

The invention relates to an expandable vacuum chamber (10) having flat frame elements (14) and end plates (12) and to a method for producing such a vacuum chamber (10). The end plates (12) are lined up in front of and behind the frame elements (14) in the axial direction ($R_a$) and, together with the frame elements (14), delimit a chamber volume of the vacuum chamber (10).

17 Claims, 4 Drawing Sheets

(52) U.S. Cl.
CPC . *B01L 2200/0689* (2013.01); *B01L 2400/049* (2013.01)

(56) References Cited

U.S. PATENT DOCUMENTS

| | | | |
|---|---|---|---|
| 9,969,527 | B2 | 5/2018 | Smith et al. |
| 2005/0183824 | A1 | 8/2005 | Lee |
| 2010/0270299 | A1 | 10/2010 | Baltussen et al. |
| 2017/0107014 | A1 | 4/2017 | Holets et al. |
| 2019/0345749 | A1 | 11/2019 | Reich |

FOREIGN PATENT DOCUMENTS

| | | |
|---|---|---|
| CN | 1155766 C | 6/2004 |
| CN | 107570220 A | 1/2018 |
| CN | 208225964 U | 12/2018 |
| DE | 10054180 A1 | 5/2002 |
| DE | 10 2014 220 837 B3 | 1/2016 |
| DE | 10 2016 121 459 A1 | 5/2017 |
| DE | 10 2016 225 385 A1 | 6/2018 |
| EP | 1 666 148 A1 | 6/2006 |
| EP | 1 808 889 A2 | 12/2007 |
| EP | 1 238 705 B1 | 1/2011 |
| EP | 2 881 530 A1 | 6/2015 |
| FR | 2 511 265 A1 | 8/1981 |
| IT | TO20100790 A1 | 3/2012 |
| JP | 2015 175031 A | 10/2015 |
| JP | 2016-220506 A | 12/2016 |
| KR | 10 2005 0 081 341 A | 2/2004 |
| TW | M301262 U | 11/2006 |
| WO | 8703698 A1 | 6/1987 |
| WO | 2012/042409 A1 | 4/2012 |
| WO | 2013/073964 A1 | 5/2013 |

OTHER PUBLICATIONS

International Search Report Issued in PCT No. PCT/EP2020/066115, Sep. 9, 2020.

* cited by examiner

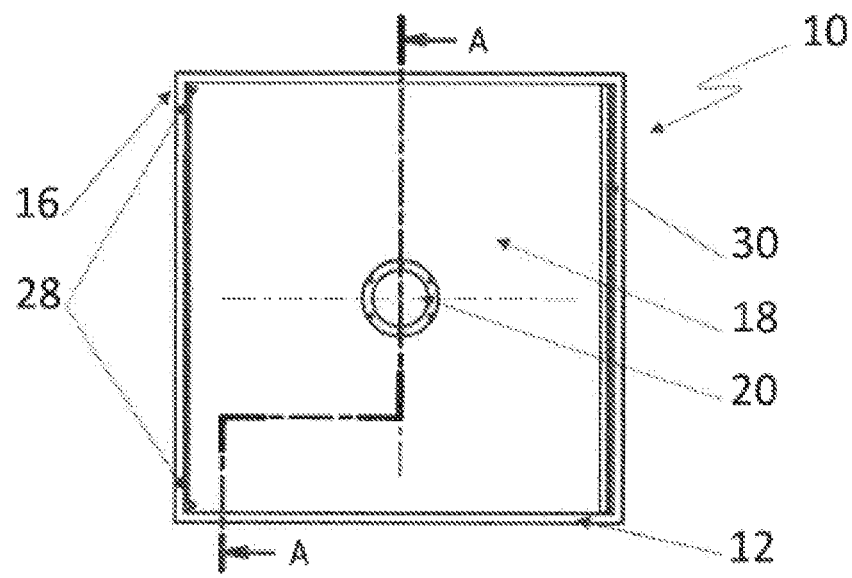
Fig. 3
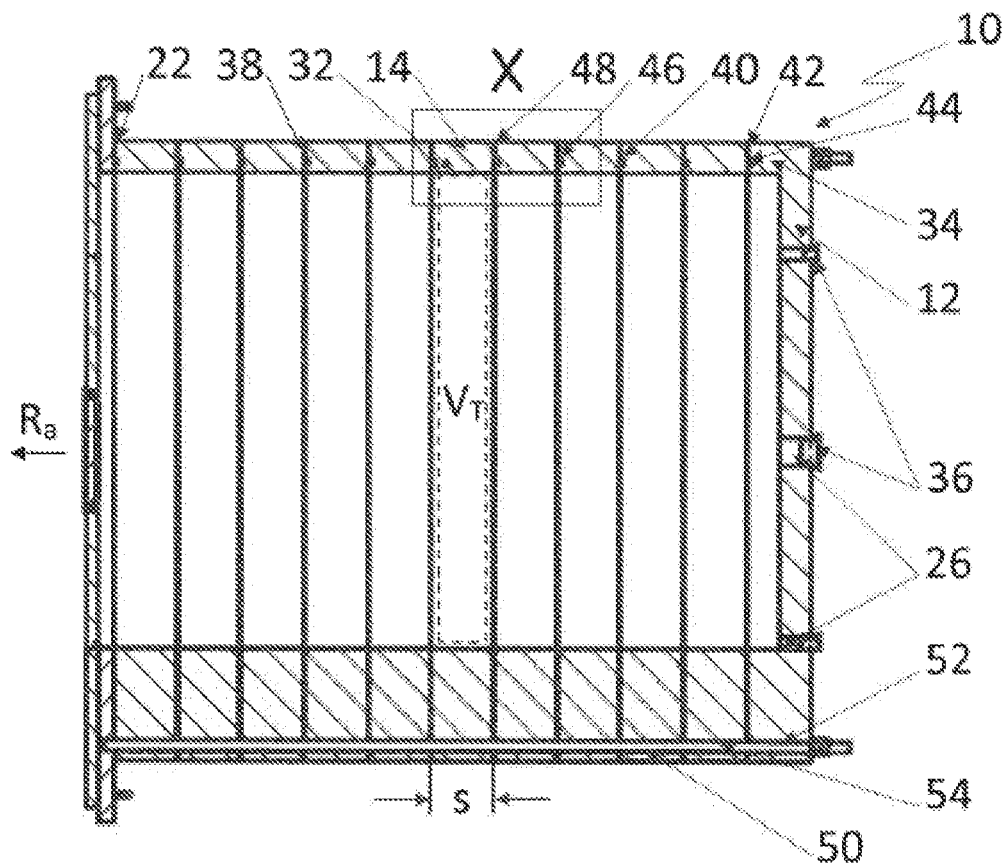
Fig. 4 (Section A-A)

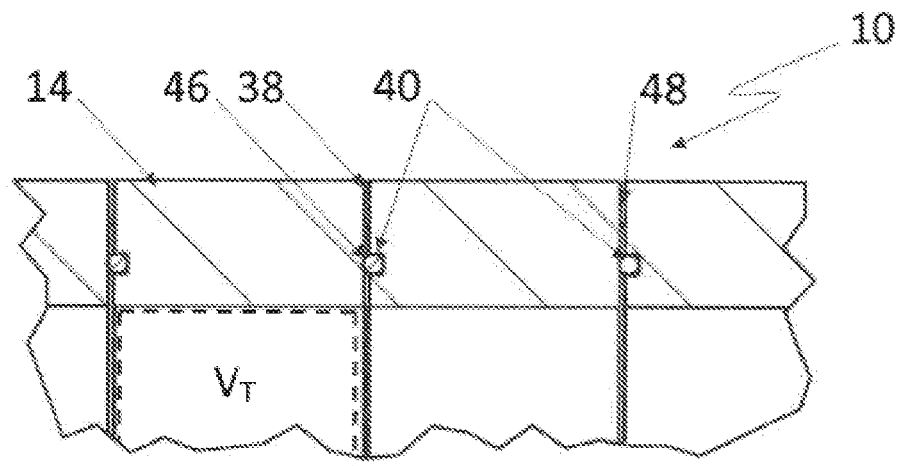
Fig. 5 (Section X)
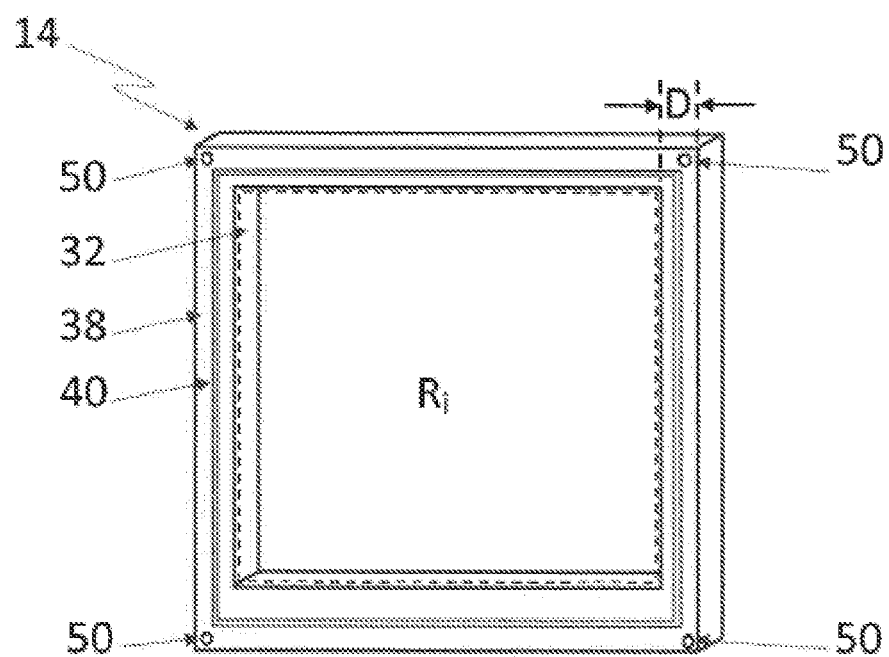
Fig. 6

EXPANDABLE VACUUM CHAMBER AND METHOD FOR PRODUCING AN EXPANDABLE VACUUM CHAMBER

BACKGROUND OF THE INVENTION

The invention relates to an expandable vacuum chamber and to a method for producing an expandable vacuum chamber.

Essentially two basic variants of vacuum chambers have become known from the prior art. The vacuum chamber is either milled from a solid material blank or welded together from individual plates arranged at right angles to one another.

The production of a vacuum chamber from a solid material blank offers a high level of security with regard to unwanted leakage openings. However, in particular in the case of large vacuum chambers, very large blocks of the material to be processed are required for this, which due to their weight are difficult to supply and can only be processed further with large and expensive milling machines. Therefore, in most cases, aluminum is used to produce vacuum chambers of this type. In addition, a lot of waste is produced when the vacuum chamber is made from a solid material blank, which has a further negative effect on the production costs.

The welding of plates and pipes has therefore established itself as the standard for the production of large vacuum chambers. This results in significantly less waste and the individual components to be welded are easier to handle in production and further processing. However, the necessary welded connections pose a risk with regard to unwanted leakage openings.

In practice, mixed forms sometimes occur. A frame milled from a solid material blank forms, for example, the supporting structure for plate walls welded or screwed thereon.

In addition, a plurality of smaller vacuum chambers, which are fluidically connected to one another, are used to produce large vacuum chambers.

U.S. Pat. No. 9,969,527 B2 describes such a modular vacuum chamber system, consisting of a plurality of interconnected chamber volumes. The frame structure of the individual chamber volumes is cube-like in shape.

Although the production of large vacuum chambers from a plurality of smaller vacuum chambers has established itself as the standard, the processing of the solid material blanks is still complex and associated with a large amount of material waste using expensive milling machines. The alternative to producing a vacuum chamber by welding plates, on the other hand, increases the risk of unwanted leakage openings.

OBJECT OF THE INVENTION

It is therefore the object of the invention to provide a leak-proof and expandable vacuum chamber using simple and inexpensive plate blanks and inexpensive tools, while reducing material waste in the production of the vacuum chamber.

DESCRIPTION OF THE DEVICE ACCORDING TO THE INVENTION

This object is achieved according to the invention by a vacuum chamber having two end plates and at least two plate-shaped frame elements, wherein the frame elements are predominantly circumferentially closed; and form a frame interior region having a circumferential wall;

whereby a partial volume of the vacuum chamber is delimited in the circumferential direction; and comprise a circumferential front frame contact surface for the arrangement of a further frame element or an end plate; and comprise a circumferential rear frame contact surface for the arrangement of a further frame element or an end plate; and wherein the at least two plate-shaped frame elements are arranged between the end plates; and wherein the two end plates comprise a front and/or rear contact surface for arrangement on a frame element; and delimit the chamber volume in a predominantly axial direction.

Hereinafter, an "axial direction" is understood to mean a direction transverse to the plate-like extension of the frame elements and end plates. A "width" is understood to mean a dimension in the direction of the plate-like extension; a "thickness" is to be understood as a dimension transverse to the direction of the plate-like extension.

The vacuum chamber according to the invention is predominantly made from plate blanks, which are significantly cheaper to procure and further process than large and heavy solid material blanks. Here, the standard dimensions of the plate blanks that are traded at particularly favorable prices can be used. The plate blanks can comprise at least one recess, in particular at least one through-recess. Conventional plate blanks have plate widths of 10 to 750 millimeters, in particular 10 to 500 millimeters, particularly preferably 10 to 200 millimeters. Because of the reduced material width, lower-performing and more cost-effective tools, in particular milling machines, can be used in the further processing of the plate blanks. The plate blanks can in particular be designed as a semi-finished product or as a cast part, particularly preferably as a cast part frame.

In contrast to the voluminous frame structures known from the prior art, flat, effectively two-dimensional, plate-like frame elements are used according to the invention.

The plate-like frame element is predominantly, in particular completely, circumferentially closed. A completely closed frame element has the highest level of security with regard to unwanted leakage openings. Depending on the design of the subsequent vacuum chamber, however, it may be necessary to provide openings and/or recesses for fluidic connection to the exterior region in the frame element.

The recesses can be incorporated into the frame element in a particularly cost-effective manner during the production of the frame element from the plate blank or in a subsequent step.

Such recesses are preferably not designed as through-recesses in the direction of the frame thickness, but merely as through-recesses in the direction of the frame width in order to avoid an excessive weakening of the strength of the frame element.

The frame element forms a circumferential wall and a frame interior region. The frame interior region, together with the frame width, forms a volume which corresponds to a partial volume of the vacuum chamber. When considering a frame element in part, this partial volume is delimited only in the circumferential direction by the wall of the frame element.

In addition, the frame element forms a front and a rear circumferential contact surface. In other words, the frame element forms these contact surfaces in the axial direction.

The formation of such contact surfaces allows further frame elements and/or end plates to be arranged on the frame element.

The vacuum chamber according to the invention comprises two end plates and at least two, in particular at least three, particularly preferably at least four, plate-shaped frame elements. The plate-shaped frame elements are arranged between the end plates, wherein the end plates comprise a front and/or rear contact surface for arrangement on a frame element. In this way, the vacuum chamber can be formed by the axial arrangement of a plurality of frame elements, but at least two frame elements, with a final arrangement of two end plates on axially opposite sides of the assembly of frame elements. In this arrangement, the partial volumes of the frame elements are added to a total volume of the vacuum chamber. The total volume is predominantly, in particular completely, delimited in the circumferential direction by the wall of the frame elements and predominantly, in particular completely, delimited in the axial direction by the end plates.

PREFERRED DEVELOPMENTS AND EMBODIMENTS

In a preferred development, at least one end plate comprises a projection which forms a projection interior region and a circumferential wall, whereby a partial volume of the vacuum chamber is delimited in the circumferential direction. The production cost of the end plates can be reduced to a minimum by choosing a suitable material thickness for the plate blanks if the material thickness of the plate blanks corresponds to the frame width of the frame elements. For example, rough machining of the end plates can generally be dispensed with if the material thickness of the plate blanks corresponds to the minimum frame width of the frame elements. This achieves a uniform strength of the wall with minimal use of material.

If the material thickness of the plate blank exceeds the frame width of the frame elements, at least one end plate can provide for the inner part of the plate blank to be removed to a certain depth. The end plate forms an axial projection with a predominantly circumferential wall. The interior region of an end plate designed in this way is accordingly delimited in an axial direction by the predominantly circumferential wall and by the part of the end plate that has not been removed.

In a preferred embodiment, at least one end plate, in particular both end plates, and the at least two frame elements are glued to one another. A particularly inexpensive and simple production of the vacuum chamber can hereby be achieved. In particular, the gluing of the at least one end plate, in particular both end plates, and the at least two frame elements when using plate blanks made of glass is suitable. By gluing only one end plate to the at least two frame elements, the vacuum chamber can be expanded in a particularly simple manner, since further frame elements can be arranged between the already glued assembly consisting of an end plate and at least two frame elements and the further end plate.

An embodiment is particularly preferred in which at least one front frame contact surface comprises a circumferential frame recess, in particular in the form of a groove having a trapezoidal cross section, for the arrangement of a sealing means. A circumferential frame recess is particularly advantageous with regard to the positioning of a sealing means on the contact surface and the provision of a pinch region for the sealing means when a further frame element or an end plate is arranged. The frame recess may comprise any cross section. In terms of inexpensive and simple production, a frame recess is suitable that can be produced in just one processing step and therefore comprises a rectangular cross section without an undercut. When the frame recess is formed with an undercut, an improved clamping effect of the frame recess is achieved when a sealing means is arranged. The frame recess comprises in particular a trapezoidal cross section. In order to further increase the sealing effect, further circumferential frame recesses can in particular be provided for the arrangement of a sealing means.

Another preferred embodiment provides that a sealing means, in particular an O-ring, of the vacuum chamber is arranged on the at least one front frame contact surface. The sealing means seals the interior region of the vacuum chamber from the exterior region. The sealing means can be used particularly effectively if it is arranged between two frame elements or between a frame element and an end plate. The use of an elastomer, in particular a rubber lining, as a sealing means is of particular importance. In combination with a frame recess, the design of the sealing means as a rubber ring, in particular an O-ring, particularly preferably as a rectangular ring, is particularly suitable. In a particular embodiment, the sealing effect can thus be adapted to the field of application of the vacuum chamber. Furthermore, more complex sealing means, for example a labyrinth seal, are also conceivable.

In a preferred embodiment, at least one rear frame contact surface comprises a circumferential recess, in particular in the form of a groove having a semicircular cross section, for arrangement on a sealing means. A rear frame recess allows the sealing means to be partially received and thereby causes the sealing means to overlap the gap between two frame elements or between a frame element and an end plate, with a particularly beneficial effect on the sealing effect of the sealing means.

Furthermore, an embodiment is preferred in which the frame elements each comprise at least two, in particular at least three, particularly preferably at least four, frame through-recesses for receiving a fastening means. The frame through-recesses are formed in the axial direction, transversely to a plate-like extension of the frame element, in the frame region and serve to accommodate a fastening means for connecting the frame elements and/or the end plates. A symmetrical arrangement of at least two fastening means, in particular all fastening means, on the frame element is particularly favorable with regard to production costs. By increasing the number of fastening means, an improved surface pressure can be achieved when connecting the frame elements and/or end plates, which has a particularly favorable effect on the sealing action. The frame through-recesses can also in particular comprise a thread in order to allow a screw connection. The thread can be formed in the frame element or arranged on the frame through-recess. The thread can be arranged in the frame through-recess, for example, by means of a threaded sleeve.

In a preferred development, at least two frame through-recesses are aligned with frame through-recesses of at least one adjoining frame element. Such an arrangement of the frame through-recesses allows a particularly favorable connection of the frame elements by means of a complete or partial through-bolted connection. For example, a fastening means could be inserted through a frame element through-recess of a first frame element and through a second frame element through-recess of a second frame element in order to be finally fastened in a third frame element through-recess of a third frame element. A wide variety of combinations are conceivable.

Furthermore, an embodiment is preferred in which at least one end plate comprises at least two, in particular at least three, particularly preferably at least four, end plate recesses, in particular end plate through-recesses, for receiving a fastening means. As a result, a procedure analogous to the production of the frame elements can be used to produce the end plates, which has a particularly favorable effect on the production process of the vacuum chamber.

A preferred development provides that at least two end plate recesses, in particular end plate through-recesses, are aligned with frame through-recesses of an adjoining frame element, in particular with frame through-recesses of all frame elements. This means that the production process for all frame elements and end plates can be standardized to a large extent. Furthermore, the frame elements and end plates can be connected to one another in a particularly simple manner. In particular, by aligning the at least two end plate through-recesses with frame through-recesses of all frame elements, the frame elements can be connected in a particularly simple manner to form a vacuum chamber.

A further development is preferred in which at least one end plate recess, in particular an end plate through-recess, comprises a thread. The thread can be formed in the end plate or arranged on the end plate through-recess. The thread can be arranged in the end plate through-recess, for example, by means of a threaded sleeve. In this way, the connection of the end plate can be established particularly favorably by means of a screw connection.

In a preferred development, the at least two frame elements and the two end plates are pressed together by at least two fastening means, in particular by a screw connection.

A preferred embodiment provides that at least one end plate comprises at least one through-recess which fluidly connects the interior of the chamber to the exterior of the chamber and comprises a connection option for a line.

An embodiment is particularly preferred in which at least one end plate comprises an openable portion, in particular a door flange having a door arranged thereon. The vacuum chamber is particularly easily accessible via an openable portion without dismantling for maintenance purposes or for equipping with objects. The openable portion particularly preferably allows unimpeded access to the vacuum chamber via the surface of the entire frame interior region of the underlying frame element. In other words, the openable portion of the end plate is then at least the same size as the frame interior region of the underlying frame element.

In a preferred development, the openable portion, in particular the door arranged on the door flange, comprises a viewing window. A viewing window allows a view into the vacuum chamber while it is in operation.

One embodiment provides that the clear cross section of the frame interior of the at least two frame elements, in particular the predominant number of frame elements, particularly preferably all frame elements, is the same.

In a preferred embodiment, the at least two frame elements, in particular the predominant number of frame elements, preferably all frame elements, are designed to be the same, in particular to be identical. By aligning the frame elements with one another, the number of identical parts in production is increased. As a result, production can be carried out particularly cost-effectively and efficiently. In addition, the expansion of the vacuum chamber is made possible in a particularly simple manner by increasing the number of frame elements. If the frame elements are designed in the same way, no attention needs to be paid to their compatibility with one another or the order of arrangement.

A preferred embodiment provides that the frame width of the at least two frame elements varies in the circumferential direction. In this way, the strength of the frame elements can be specifically adapted to the ambient conditions of the vacuum chamber. For example, a portion of the wall of the frame elements can be made wider or narrower.

In a preferred development, the frame width of the lower frame part of the at least two frame elements, in an intended installation position of the vacuum chamber, is greater than the frame width of the other frame parts. This creates a particularly solid base plate for the vacuum chamber.

An embodiment is preferred in which an end plate having at least one external dimension projects beyond the at least two frame elements and the other end plate in order to form an axial stop surface. The stop surface is particularly suitable as a positioning aid for the vacuum chamber when it is to be arranged in a complementary receptacle.

A preferred embodiment provides that the outer contours of that least two frame elements and/or the two end plates are predominantly rectangular, in particular square. The shaping of the outer contour is based in a particularly favorable manner on the shape of the plate blanks used, since this results in the least amount of material waste during production.

An embodiment is preferred in which the at least two frame elements frame a predominantly rectangular, in particular square, interior region. In combination with a rectangular, in particular square, design of the outer contour, production can be particularly material-efficient, since the outer contour of a next smaller frame element is created by milling out an inner contour of a first frame element in the same work step. As a result, production can be carried out particularly effectively.

The frame elements and end plates are preferably made from aluminum, in particular from cast aluminum plates, since aluminum has proven to be particularly advantageous in terms of weight and production. It would also be conceivable, depending on the requirements of the vacuum chamber, to use other materials, in particular other metals or glass.

DESCRIPTION OF THE METHOD ACCORDING TO THE INVENTION

The object is also achieved by a method for producing a, in particular previously described, vacuum chamber having two end plates and at least two plate-shaped frame elements, comprising the following method steps:
  A) Creating a frame element from a plate blank;
  G) Creating at least one further frame element from a plate blank;
  M) Connecting the end plates and the frame members to form a vacuum chamber.

The method according to the invention may comprise one or more further method steps before, between and/or after the stated method steps.

A tool, in particular a milling machine, preferably produces a frame element from a plate blank in a first machining step. The plate blank for producing the frame element is designed in particular as a semi-finished product having a recess, particularly preferably as a cast part frame. A recess already formed in the plate blank reduces the processing complexity of the plate blank and the material waste that is produced during processing. A further method step provides for at least one further frame element to be created, in particular analogously to method step A). After the at least two frame elements have been created, they are connected to the end plates in a, in particular last, method step to form a vacuum chamber.

PREFERRED DEVELOPMENTS AND METHOD STEPS

A method having the following method step is preferred:
B) Removing a frame interior region from a plate blank to create a frame element.

A tool, in particular a milling machine, preferably produces only the inner contour of the frame element from the plate blank in a first machining step of the plate blank, wherein the inner part of the plate blank remains unprocessed. In other words, a frame-like part is cut from the plate blank. As a result, this milled-out part can continue to be used for a frame element of a smaller vacuum chamber reduced by the frame width. This process can be continued down to an uneconomical minimum size of the frame element, so that material waste is reduced to a minimum.

The processing of the plate blanks can be carried out using a milling machine as described above. In general, other methods, for example sawing, laser cutting, high-pressure water jet cutting, etc., are also suitable for removing the frame interior region from the panel blank. The frame interior region preferably corresponds to the cut-out interior of the plate blank including the milling path.

A preferred development of the method provides the following method step:
C) Removing a circumferential frame recess for the arrangement of a sealing means.

Sealing means can be used to seal any leakage openings between the frame elements and the frame elements and the end plates. In a particular embodiment, the sealing means are arranged on a circumferential frame recess. Particularly preferably, this circumferential frame recess is removed from the frame element during or immediately before or after the frame interior region is removed from the plate blank, in particular with the same tool. This has the advantage of a particularly simple production of the frame elements.

A method having the following method step is also preferred:
D) Removing at least two, in particular at least three, particularly preferably at least four, frame through-recesses.

A method step immediately preceding or following method step A) of removing frame through-recesses allows the frame through-recesses to be precisely arranged in the frame element, since the frame element does not have to be repositioned in a tool device. Thus, production accuracy can be further increased. As an alternative, provision can be made for the frame through-recesses to be cut out at a later point in time during the process together with other frame elements and end plates. As a result, the recesses can be aligned particularly precisely with one another.

In a preferred development, the method includes the following step:
E) Removing at least one recess on the frame element for the fluidic connection of the frame interior region to the exterior in the assembled state of the vacuum chamber.

Depending on the embodiment of the frame element, it can be provided to form a connection in the form of a through-recess in the direction of extension of the frame element on the frame element. It is particularly favorable here to remove the recess during or immediately before or after the removal of the frame interior region, in particular with the same tool.

A method having the following method step is also preferred:
F) Surface processing the created frame element.

The surface processing of the resulting frame element favors the subsequent and as tolerance-free as possible joining of the frame elements. It is therefore particularly advantageous to follow the rough machining of the frame element with a finer surface machining in order to avoid repositioning the frame element at a later point in time.

The method having the following method step is also preferred:
H) Removing a recess from a plate blank to create an end plate having an axial projection;

As a result, both the production of frame elements and the production of end plates can be carried out with the same tool.

A preferred further development provides the following method step:
I) Creating an end plate by removing a circumferential end plate recess for the arrangement of a sealing means.

Sealing means can be used to seal any leakage openings between the frame elements and the end plates. In a particular embodiment, the sealing means are arranged on a circumferential end plate recess. Particularly preferably, this circumferential end plate recess is removed from the end plate during or immediately before or after the removal of a recess to create an axial projection from the plate blank, in particular with the same tool. This has the advantage that the end plate is particularly simple to produce.

In a preferred development, the following method step is provided:
J) Removing at least two, in particular at least three, particularly preferably at least four, end plate recesses.

A method step of removing end-plate recesses, in particular end-plate through-recesses, immediately preceding or following a method step for producing the end plate, allows the precise arrangement of the end-plate recesses on the end plate, since the end plate does not have to be repositioned in a tool device. Thus, production accuracy can be further increased. Alternatively, provision can be made for the end plate recesses to be cut out at a later point in time during the process together with other frame elements and a further end plate. As a result, the recesses can be aligned particularly precisely with one another.

A preferred method includes the following method step:
K) Surface processing the created end plate.

A method step for surface processing immediately following the creation of the end plate reduces manufacturing tolerances and allows improved joining of the end plate during assembly of the vacuum chamber.

A method having the following method step is also preferred:
L) Using the removed frame interior region to create a next smaller end plate or a next smaller frame element.

By reusing the removed frame interior region in the production of a frame element, the use of material in the production of the vacuum chamber can be further reduced. The removed frame interior region is used to produce a next smaller frame element and/or a next smaller end plate for a next smaller vacuum chamber.

Furthermore, in an independent aspect of the invention, a method for producing an end plate and/or a frame element for a vacuum chamber comprising successive removal of frame elements from a plate blank is provided. As a result, a plate blank can be used particularly economically, since the removed frame interior region can be used to produce a further, next smaller frame element or a next smaller end plate. The method can be continued down to an uneconomical minimum size of the resulting frame interior region. Furthermore, this method can be carried out in any combination with the method steps described herein.

A "plate-like" or "plate-shaped frame element" is understood to mean an element delimiting at least a partial volume of the vacuum chamber, wherein the element is extended primarily through a plane spanned by the primary directions of extension, and the delimited partial volume lies within this plane or in planes parallel to this plane.

The plate-like or plate-shaped frame element consists of a single plate blank, wherein the plate-like or plate-shaped frame element is equal to or smaller than the dimensions of the plate blank in all directions of extension. The outer dimensions of the plate blank preferably correspond to the outer dimensions of the frame element to be produced.

The frame elements have an extension ratio of frame element width or plate/blank width to the minimum extension in one of the planar extension directions of 1 to 3, in particular 1 to 5, particularly preferably 1 to 10.

The frame elements are preferably arranged in a row in a direction transverse to the main directions of extension or transversely to the plate-like extension, in particular perpendicular to the plane of the plate blank.

The main directions of extension—or the plane/plate-like extension—of the frame element correspond to the main directions of extension—or the plane extension—of the plate blank.

The wall of the frame interior region is formed at an angle between 45 to 90°, in particular between 60 to 90°, particularly preferably at an angle between 80 to 90°, to the plane extension of the frame element.

The frame elements are preferably in one piece.

The end plates comprise a circumferential contact surface.

The circumferential contact surface of the end plate is preferably predominantly, in particular over the entire surface, in direct contact with the circumferential contact surface of the frame element made by a sealing means, in particular in the form of an elastomer, particularly preferably in the form of a rubber O-ring.

The further frame element is particularly preferably produced in method step G) by removing a further frame interior region using the tool.

Further advantages of the invention can be found in the descriptions and the drawings. Likewise, according to the invention, the aforementioned features and those which are to be explained below can each be used individually for themselves or for a plurality of combinations of any kind. The embodiments shown and described are not to be understood as an exhaustive enumeration but rather have exemplary character for the description of the invention.

DETAILED DESCRIPTIONS OF THE INVENTION AND DRAWINGS

FIG. 3 is a front view of the vacuum chamber from FIG. 1;

FIG. 4 is a sectional side view of the vacuum chamber along the line A-A from FIG. 3;

FIG. 5 shows a section X of the vacuum chamber from FIG. 4;

FIG. 6 shows a frame element of the vacuum chamber from FIGS. 1 to 5;

Figure 1:
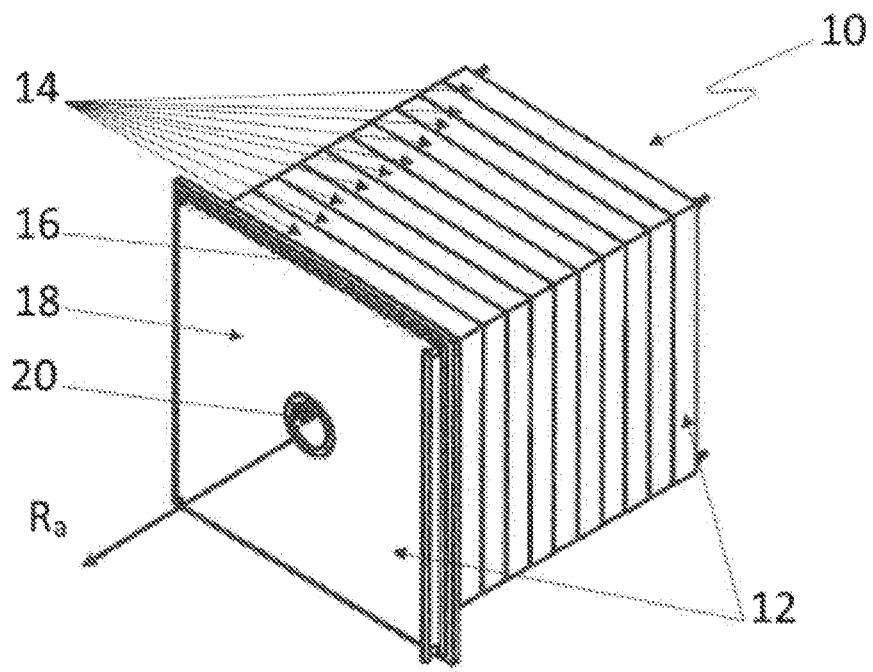
FIG. 1 is a perspective view of an embodiment of a vacuum chamber according to the invention.

FIG. 1 is a perspective view of an embodiment of a vacuum chamber 10 according to the invention having two angular end plates 12 and ten angular, plate-shaped frame elements 14. The plate-shaped frame elements 14 are arranged between the end plates 12 in the axial direction $R_a$—in other words, in a direction transverse to the plate-shaped extension of the frame elements 14 and end plates 12. An end plate 12 comprises a door flange 16 having a door 18 arranged thereon. The door 18 comprises a viewing window 20.

Figure 2:
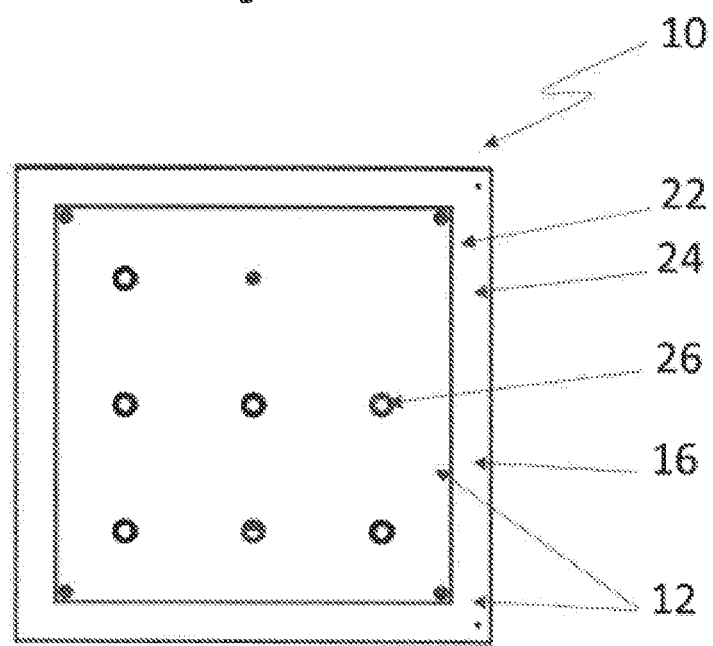
FIG. 2 is a rear view of the vacuum chamber from FIG. 1.

FIG. 2 is a rear view of the vacuum chamber 10 from FIG. 1. The front end plate 12 designed as a door flange 16 in the axial direction $R_a$ (cf. FIG. 1) projects beyond the rear end plate 12 and the frame elements 14 lying between them (cf. FIG. 1) in terms of their external dimensions. As a result, a rear end plate contact surface 22 forms a stop surface 24 in the axial direction $R_a$ (cf. FIG. 1), with which the vacuum chamber 10 can be positioned in a receptacle as intended in a particularly simple manner. The rear end plate 12 in the axial direction $R_a$ (cf. FIG. 1) comprises a plurality of, in particular eight, through-recesses 26 which connect the interior of the vacuum chamber 10 to the exterior. The equipment required for operating the vacuum chamber 10 or for carrying out certain processes can be connected via these through-recesses 26. For the sake of clarity, only one through-recess 26 has been provided with a reference sign.

FIG. 3 is a front view of the vacuum chamber 10. The viewing window 20 is arranged centrally in the door 18. The door 18 is fastened to the door flange 16 via two hinges 28 and comprises a handle 30. The arrangement of the door flange 16 and door 18, as well as the door 18 and viewing window 20, is sealed off from one another (not shown).

FIG. 4 is a side view of the vacuum chamber 10 cut along the section mark A-A from FIG. 3. The frame elements 14, of which only one is provided with a reference sign for the sake of clarity, form a circumferentially predominantly closed and circumferential wall 32 which frames the frame interior region $R_i$ (cf. FIG. 6). In combination with the frame thickness S, the circumferential wall 32 delimits a partial volume $V_T$ of the vacuum chamber 10 in the circumferential direction. The axial arrangement of the frame elements 14 thus creates a total volume of the vacuum chamber 10, which is delimited predominantly in the axial direction $R_a$ by the end plates 12.

The vacuum chamber 10 comprises an end plate 12 which forms an axial projection 34 having a predominantly circumferential wall. In addition to the axial wall, the interior region of an end plate 12 designed in this way is delimited by the wall of the projection 34 running around in the circumferential direction. The end plate 12 also comprises through-recesses 26 and line connections 36. These allow the leak-free connection of equipment required to operate the vacuum chamber or to carry out special processes.

The frame elements 14 comprise a circumferential frame recess 40 on the circumferential front frame contact surfaces 38 and an end plate 12 comprises a circumferential end-plate recess 44 on the front end plate contact surface 42. A sealing means 46 is arranged between the frame elements 14 or between the frame element 14 and the end plate 12, both on the circumferential frame recesses 40 and preferably on the circumferential end plate recess 44. The end plates 12 and frame elements 14 are arranged against one another in the axial direction $R_a$ via the front and rear contact surfaces 38, 48, 42 and 22.

The frame elements 14 comprise preferably four frame through-recesses 50; the end plate 12 and the door flange 16 each comprise preferably four end plate recesses 52 which are aligned with the other recesses. Furthermore, preferably four fastening means 54 are arranged on the frame elements 14 and the end plates 12 in order to press them together. The assembly of the vacuum chamber 10 is particularly inexpensive and simple to carry out in this way, since the frame elements 14 and the end plates 12 can be arranged one above the other and then the fastening means 54 can be arranged on the overall assembly. It would also be conceivable, however, for various assembly parts to be prefabricated by fastening means 54 and then for the assembly parts to be connected to form a vacuum chamber 10 as a whole.

FIG. 5 shows an enlarged section X from FIG. 4. An O-ring 46 is arranged between two frame elements 14. On their front contact surface 38, the frame elements 14 comprise the circumferential frame recess 40, in particular designed as a groove, for receiving the O-ring 46. The circumferential frame recess 40 is preferably trapezoidal in its cross section in order to ensure an optimal fit of the O-ring 46.

FIG. 6 shows a single frame element 14 of the vacuum chamber 10 shown in FIGS. 1 to 4 having four frame through-recesses 50. The circumferential wall 32 frames the frame interior region $R_i$. A frame width D determines the wall thickness of the vacuum chamber 10. The frame element 14 has a frame width D that varies in the circumferential direction. While the frame element 14 has a constant frame width D in the installed position on the lateral parts and the upper part of the frame element 14, the frame width D on the lower part of the frame element 14 is reinforced to form a solid base plate.

Figure 7:
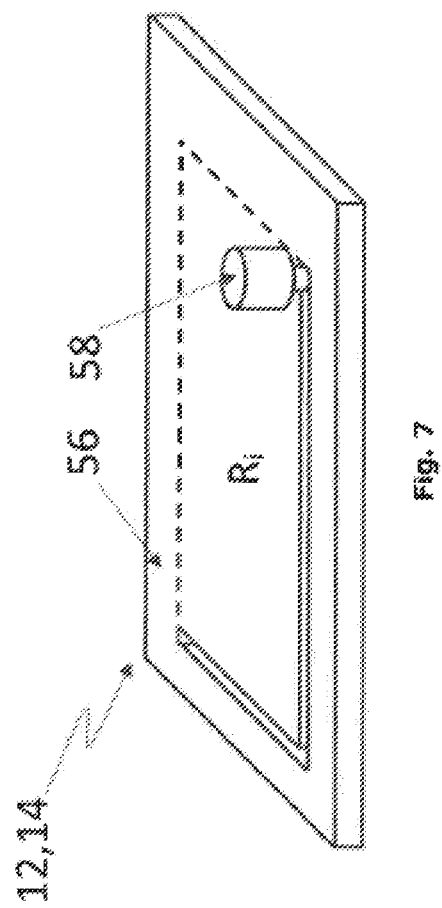
FIG. 7 shows a method step according to the invention for producing an end plate and/or a frame element.

FIG. 7 shows a method step for producing a frame element 14 according to the invention or an end plate 12 according to the invention. The frame interior region $R_i$ of a plate blank 56 is removed by means of a tool 58, in particular a milling cutter. The resulting frame interior region $R_i$ is used in the further process as a plate blank 56 for a next smaller frame element 14 or a next smaller end plate 12.

Taking all the figures of the drawings together, the invention relates to an expandable vacuum chamber 10 having flat frame elements 14 and end plates 12, as well as to a method for producing such a vacuum chamber 10. The end plates 12 are lined up in front of and behind the frame elements 14 in the axial direction $R_a$ and, together with the frame elements 14, delimit a chamber volume of the vacuum chamber 10.

LIST OF REFERENCE SIGNS

10 Vacuum chamber
12 End plate
14 Plate-shaped frame element
16 Door flange
18 Door
20 Viewing window
22 Rear end plate contact surface
24 Stop surface
26 Through-recess
28 Hinge
30 Handle
32 Circumferential wall
34 Projection
36 Line connection
38 Front frame contact surface
40 Circumferential frame recess
42 Front end plate contact surface
44 Circumferential end plate recess
46 Sealing means
48 Rear frame contact surface
50 Frame through-recess
52 End plate recess
54 Fastening means
56 Plate blank
58 Tool
$R_a$ Axial direction
$R_i$ Frame interior region
A-A Section mark
X Section
D Frame width
S Frame thickness
$V_T$ Partial volume

The invention claimed is:

1. A vacuum chamber comprising:
   two end plates; and
   at least two flat, effectively two-dimensional, plate-like, plate-shaped frame elements, wherein the frame elements are completely circumferentially closed and form a frame interior region having a circumferential wall, wherein a partial volume of the vacuum chamber is delimited in the circumferential direction;
   wherein each of the plate-shaped frame elements comprise a circumferential front frame contact surface for the arrangement of a further frame element or an end plate and comprise a circumferential rear frame contact surface for the arrangement of a further frame element or an end plate; and
   wherein the at least two plate-shaped frame elements are arranged between the end plates; and
   wherein the two end plates comprise a front and/or rear contact surface for arrangement on a frame element and delimit the chamber volume in the axial direction;
   wherein a thickness of the plate-shaped frame elements is defined extending from the circumferential front frame contact surface to the circumferential rear frame contact surface; and
   at least four through holes extend through the thickness of the plate-shaped frame elements.

2. The vacuum chamber according to claim 1, wherein at least one front frame contact surface comprises a circumferential frame recess, in the form of a groove having a trapezoidal cross section, for the arrangement of a sealing means.

3. The vacuum chamber according to claim 1, wherein a sealing means, being an O-ring, of the vacuum chamber is arranged on the at least one front frame contact surface.

4. The vacuum chamber according to claim 1, wherein at least one rear frame contact surface comprises a circumferential recess, in the form of a groove having a semicircular cross section, for the arrangement of a sealing means.

5. The vacuum chamber according to claim 1, wherein the frame elements each comprise the at least four through holes configured for receiving a fastening means.

6. The vacuum chamber according to claim 5, wherein the at least four through holes of one frame element are aligned with the at least four through holes of an adjoining frame element.

7. The vacuum chamber according to claim 6, wherein at least one end plate comprises at least four through holes configured for receiving the fastening means.

8. The vacuum chamber according to claim 7, wherein at least two end plate through-recesses are aligned with the frame through-recesses of an adjoining frame element and with the frame through-recesses of all frame elements.

9. The vacuum chamber according to claim 7, wherein at least one end plate through-recess comprises a thread.

10. The vacuum chamber according to claim 8, wherein the at least two frame elements and the two end plates are pressed together by at least two fastening means, being a screw connection.

11. The vacuum chamber according to claim 1, wherein at least one end plate comprises an openable portion, being a door flange having a door arranged thereon.

12. The vacuum chamber according to claim 1, wherein the at least two frame elements are identical.

13. The vacuum chamber according to claim 1, wherein a frame width of the at least two frame elements varies in the circumferential direction.

14. The vacuum chamber according to claim 1, wherein an end plate having at least one external dimension projects beyond the at least two frame elements and the other end plate forming an axial stop surface.

15. The vacuum chamber of claim 1, wherein each of the at least two flat, effectively two-dimensional, plate-like, plate-shaped frame elements have a width that ranges from 10 to 200 millimeters.

16. The vacuum chamber of claim 1, wherein the at least four through holes of the plate-shaped frame elements are not tapped.

17. The vacuum chamber of claim 2, wherein the at least four through holes are disposed outside the circumferential frame recess.

* * * * *